(12) United States Patent
Pascali et al.

(10) Patent No.: US 9,076,239 B2
(45) Date of Patent: Jul. 7, 2015

(54) METHOD AND SYSTEMS FOR THUMBNAIL GENERATION, AND CORRESPONDING COMPUTER PROGRAM PRODUCT

(75) Inventors: Stefano Pascali, Lecce (IT); Andrea Riccardo Palmieri, Campi Salentina (IT)

(73) Assignee: STMICROELECTRONICS S.R.L., Agrate Brianza (IT)

(*) Notice: Subject to any disclaimer, the term of this patent is extended or adjusted under 35 U.S.C. 154(b) by 1747 days.

(21) Appl. No.: 12/433,276

(22) Filed: Apr. 30, 2009

(65) Prior Publication Data

US 2010/0278443 A1 Nov. 4, 2010

(51) Int. Cl.
| | |
|---|---|
| *G06K 9/36* | (2006.01) |
| *G06T 1/60* | (2006.01) |
| *G06T 3/00* | (2006.01) |
| *G06T 3/40* | (2006.01) |
| *G06T 9/00* | (2006.01) |

(52) U.S. Cl.
CPC ............ *G06T 1/60* (2013.01); *G06T 3/0012* (2013.01); *G06T 3/40* (2013.01); *G06T 9/00* (2013.01)

(58) Field of Classification Search
CPC .......... H04N 7/173; H04N 7/16; G09G 5/00; G06F 15/80; G06T 1/60; G06T 3/0012; G06T 3/40; G06T 9/00; G06K 9/00; G06K 9/32
See application file for complete search history.

(56) References Cited

U.S. PATENT DOCUMENTS

| | | | |
|---|---|---|---|
| 5,872,874 A | 2/1999 | Natarajan | |
| 5,893,116 A * | 4/1999 | Simmonds et al. | 709/229 |
| 6,002,794 A | 12/1999 | Bonneau et al. | |
| 6,067,068 A | 5/2000 | Hussain | |
| 6,121,969 A * | 9/2000 | Jain et al. | 715/850 |
| 6,240,210 B1 | 5/2001 | Koyama | |
| 6,263,119 B1 * | 7/2001 | Martucci | 382/298 |
| 6,356,667 B1 | 3/2002 | Fukuhara | |
| 6,418,489 B1 | 7/2002 | Mason et al. | |
| 6,545,687 B2 * | 4/2003 | Scott et al. | 345/629 |
| 6,711,285 B2 * | 3/2004 | Noguchi | 382/162 |
| 6,778,707 B1 * | 8/2004 | de Queiroz | 382/233 |
| 6,886,034 B2 * | 4/2005 | Blumberg | 709/217 |

(Continued)

FOREIGN PATENT DOCUMENTS

| | | | |
|---|---|---|---|
| DE | EP 0859335 B1 * | 7/1998 | G06T 3/40 |
| WO | 94/22108 | 9/1994 | |

OTHER PUBLICATIONS

Silberschatz et al. 2002; Operating System Concepts, Chapter 12: File System Implementation (2002), pp. 1-24.

*Primary Examiner* — Chan Park
*Assistant Examiner* — Mia M Thomas
(74) *Attorney, Agent, or Firm* — Seed IP Law Group PLLC

(57) ABSTRACT

An embodiment of a consumer electronics product having a thumbnail display feature includes a system for generating and storing thumbnails having a given size from images, such as JPEG images, for which a spatial frequency domain representation is available. The system includes a zooming processor to reduce the size of the images by zooming. The zooming processor is configured to perform both spatial frequency domain zooming to approximate the desired thumbnail size and then image pixel domain zooming to fit the desired thumbnail size. The product includes cache storage configured to store a plurality of thumbnails in a file system as free blocks in the file system, so that file system data structures are left unchanged.

39 Claims, 2 Drawing Sheets

(56) References Cited

U.S. PATENT DOCUMENTS

| | | | |
|---|---|---|---|
| 7,006,099 B2 * | 2/2006 | Gut et al. ............... 345/557 |
| 7,054,496 B2 | 5/2006 | Miceli et al. |
| 7,113,543 B2 | 9/2006 | Cheung et al. |
| 7,272,258 B2 * | 9/2007 | Berkner et al. ............ 382/176 |
| 7,366,319 B2 | 4/2008 | Andrew et al. |
| 7,446,782 B2 | 11/2008 | Ishikawa et al. |
| 7,474,795 B2 * | 1/2009 | Sirohey et al. ............ 382/240 |
| 7,536,446 B2 * | 5/2009 | Blumberg ............... 709/217 |
| 7,616,815 B2 * | 11/2009 | Berkner et al. ............ 382/176 |
| 7,864,352 B2 * | 1/2011 | Hull et al. ............... 358/1.15 |
| 7,920,299 B2 | 4/2011 | Abraitis et al. |
| 7,969,609 B2 * | 6/2011 | Petz ............... 358/1.18 |
| 8,122,059 B2 * | 2/2012 | Gut et al. ............... 707/802 |
| 8,340,411 B2 * | 12/2012 | Fillion et al. ............ 382/163 |
| 8,386,531 B2 * | 2/2013 | Gut et al. ............... 707/802 |
| 8,463,076 B2 * | 6/2013 | Kondo ............... 382/299 |
| 8,539,120 B1 | 9/2013 | Sha et al. |
| 8,581,937 B2 * | 11/2013 | Intwala ............... 345/660 |
| 8,682,090 B2 | 3/2014 | Suzuki et al. |
| 8,755,620 B2 | 6/2014 | Sasai et al. |
| 8,873,870 B2 | 10/2014 | Suzuki et al. |
| 8,873,873 B2 | 10/2014 | Suzuki et al. |
| 2001/0009420 A1 * | 7/2001 | Kamiwada et al. ............ 345/629 |
| 2001/0037433 A1 | 11/2001 | Dempsey et al. |
| 2002/0000998 A1 * | 1/2002 | Scott et al. ............... 345/667 |
| 2002/0075392 A1 * | 6/2002 | Imaeda ............... 348/333.05 |
| 2002/0103970 A1 * | 8/2002 | Gut et al. ............... 711/118 |
| 2002/0172225 A1 | 11/2002 | Ang et al. |
| 2003/0074525 A1 * | 4/2003 | Yamauchi et al. ............ 711/113 |
| 2003/0133007 A1 | 7/2003 | Iijima et al. |
| 2003/0188121 A1 | 10/2003 | Roy et al. |
| 2004/0032968 A1 | 2/2004 | Andrew et al. |
| 2004/0170331 A1 | 9/2004 | Henry |
| 2004/0172495 A1 * | 9/2004 | Gut et al. ............... 711/1 |
| 2004/0236897 A1 | 11/2004 | Cheng |
| 2005/0008195 A1 | 1/2005 | Kondo et al. |
| 2005/0025389 A1 * | 2/2005 | Mifune et al. ............ 382/305 |
| 2005/0041886 A1 * | 2/2005 | Wada ............... 382/305 |
| 2005/0047667 A1 | 3/2005 | Ju |
| 2005/0053302 A1 * | 3/2005 | Srinivasan et al. ............ 382/248 |
| 2005/0134945 A1 * | 6/2005 | Gallagher ............... 358/527 |
| 2005/0172080 A1 * | 8/2005 | Miyauchi ............... 711/136 |
| 2005/0225807 A1 | 10/2005 | Fainstain et al. |
| 2006/0110055 A1 * | 5/2006 | Shiina ............... 382/232 |
| 2006/0140494 A1 * | 6/2006 | Ishikawa ............... 382/239 |
| 2006/0190688 A1 | 8/2006 | Van Eijndhoven et al. |
| 2006/0242163 A1 * | 10/2006 | Miller et al. ............... 707/100 |
| 2007/0036218 A1 | 2/2007 | Burazerovic |
| 2007/0058872 A1 | 3/2007 | Jang et al. |
| 2007/0076971 A1 | 4/2007 | Roimela et al. |
| 2007/0168615 A1 | 7/2007 | Van Eijndhoven et al. |
| 2007/0172117 A1 | 7/2007 | Wong |
| 2007/0198951 A1 * | 8/2007 | Frank ............... 715/838 |
| 2007/0219968 A1 * | 9/2007 | Frank ............... 707/3 |
| 2007/0230829 A1 * | 10/2007 | Sirohey et al. ............ 382/299 |
| 2007/0237414 A1 | 10/2007 | Cho et al. |
| 2007/0242895 A1 | 10/2007 | Bandou et al. |
| 2007/0273702 A1 | 11/2007 | Ishii |
| 2007/0279696 A1 * | 12/2007 | Matsuzaka ............... 358/3.26 |
| 2007/0286508 A1 | 12/2007 | Le Leannec et al. |
| 2008/0049145 A1 * | 2/2008 | Yokoyama et al. ............ 348/699 |
| 2008/0056586 A1 * | 3/2008 | Cheng et al. ............... 382/232 |
| 2008/0111722 A1 | 5/2008 | Reznik |
| 2008/0118143 A1 | 5/2008 | Gordon et al. |
| 2008/0229237 A1 | 9/2008 | Pagan |
| 2008/0263012 A1 * | 10/2008 | Jones ............... 707/3 |
| 2008/0285949 A1 * | 11/2008 | Weber ............... 386/95 |
| 2009/0195845 A1 * | 8/2009 | Hoshii et al. ............ 358/518 |
| 2010/0033633 A1 | 2/2010 | Dane et al. |
| 2010/0040299 A1 * | 2/2010 | Noh et al. ............ 382/233 |
| 2010/0118201 A1 * | 5/2010 | Jeong et al. ............ 348/581 |
| 2010/0278443 A1 | 11/2010 | Pascali et al. |
| 2010/0281224 A1 * | 11/2010 | Ho et al. ............... 711/137 |
| 2011/0001643 A1 | 1/2011 | Sze et al. |
| 2011/0085059 A1 * | 4/2011 | Noh ............... 348/231.99 |
| 2012/0082231 A1 | 4/2012 | Sole Rojals et al. |
| 2012/0082232 A1 | 4/2012 | Sole Rojals et al. |
| 2012/0110035 A1 * | 5/2012 | Gut et al. ............... 707/812 |
| 2012/0163448 A1 | 6/2012 | Zheng et al. |
| 2012/0163456 A1 | 6/2012 | Coban et al. |
| 2012/0328022 A1 | 12/2012 | Sasai et al. |
| 2013/0148906 A1 | 6/2013 | Pascali et al. |
| 2013/0188883 A1 | 7/2013 | Gisquet et al. |
| 2014/0270336 A1 * | 9/2014 | Eckel et al. ............ 382/100 |
| 2014/0348240 A1 | 11/2014 | Kim et al. |

\* cited by examiner

|      | 0  | 1  | 5  | 6  | 14 | 15 | 27 | 28 |
|------|----|----|----|----|----|----|----|----|
|      | 2  | 4  | 7  | 13 | 16 | 26 | 29 | 42 |
|      | 3  | 8  | 12 | 17 | 25 | 30 | 41 | 43 |
|      | 9  | 11 | 18 | 24 | 31 | 40 | 44 | 53 |
|      | 10 | 19 | 23 | 32 | 39 | 45 | 52 | 54 |
|      | 20 | 22 | 33 | 38 | 46 | 51 | 55 | 60 |
|      | 21 | 34 | 37 | 47 | 50 | 56 | 59 | 61 |
|      | 35 | 36 | 48 | 49 | 57 | 58 | 62 | 63 |

| File_ID | First Block Address |
|---------|---------------------|
|         |                     |
|         |                     |
|         |                     |

*Fig. 2*

METHOD AND SYSTEMS FOR THUMBNAIL GENERATION, AND CORRESPONDING COMPUTER PROGRAM PRODUCT

TECHNICAL FIELD

This disclosure relates to thumbnail generation.

This disclosure was devised by paying attention to its possible use in generating thumbnails for those images for which a representation is available in the spatial frequency domain; JPEG encoded images are exemplary of such images.

BACKGROUND

Thumbnail images (or, briefly, "thumbnails") are small images derived from larger images by sub-sampling.

Generation of thumbnails is an ordinary feature of personal computers and a desired feature of other consumer electronic (CE) devices such as digital photo frames, digital cameras, mobile phones, multi-function printers, etc. These devices are equipped with a screen or other display unit allowing the user to preview and/or browse digital photos and digital pictures. Providing high-quality and short-time-consuming image thumbnail generation is quite helpful in these such devices. Digital photo previewing and browsing are exemplary of the applications involving decoding a digital image (typically in JPEG format) and resizing it in order to be displayed on a specific target screen, while taking into account quality and processing time constraints.

Generation of thumbnails is addressed extensively in the scientific and technical literature including the patent literature. WO-A-94/22108, US-A-2006/242163, and U.S. Pat. Nos. 6,263,119 and 6,778,707, which are incorporated by reference, are exemplary of patent documents related to thumbnail generation.

So far, two basic approaches have been resorted to for thumbnail generation.

A first approach involves a sub-sampling procedure in the image pixel domain. After choosing a zoom-out factor, based upon the relative dimensions of the target screen and the original image, data is filtered to obtain the desired resolution. To that end, resizing is performed through a line-by-line scanning, once the original image has been completely decoded (i.e., brought back to the image pixel domain), which inherently requires a considerable amount of computational time.

Another approach involves resolution scaling implemented using spatial frequency subsampling in the DCT or transform domain, during the image decoding step. For instance, a 8×8 DCT block can be sub-sampled using a scaling ratio selected out of $\{1, \frac{1}{2}, \frac{1}{4}, \frac{1}{8}\}$ thus filtering out the high frequencies. Smaller scaling ratios permit significantly faster decoding since fewer coefficients need to be processed and a simpler IDCT method can be used. For instance, when choosing a ratio equal to $\frac{1}{8}$, only the DC component is considered. The remainder of the decoding process, including the de-quantization of the quantized AC coefficients and the IDCT, can be "skipped". Resizing may thus become a very fast process as the number of coefficients to be processed decreases, while, however, the final result may fail to optimally fit to the target screen and its shape (e.g., aspect ratio).

Additionally, certain systems such as certain embedded systems may not have sufficient memory resources to perform thumbnail caching as conventionally described in the literature, namely thumbnail caching into system mass storage (e.g., hard disk) or removable media (e.g., USB disk, SD card), which in any case involves writing files into the file system of the storage device. When removable mass-storage is used, if the media is abruptly removed during the write stage, file system corruption may occur.

SUMMARY

An embodiment of this disclosure provides an arrangement for generating image thumbnails without significant losses in quality while drastically reducing the processing time required.

Another embodiment of this disclosure provides an arrangement for generating image thumbnails that can be cached transparently in user mass storage devices.

An embodiment also relates to a corresponding system as well as a related computer program product, loadable in the memory of at least one computer and including software code portions for performing the steps of an embodiment of a method when the product is run on a computer. As used herein, reference to such a computer program product is intended to be equivalent to reference to a computer-readable medium containing instructions for controlling a computer system to coordinate the performance of a method embodiment. Reference to "at least one computer" is intended to highlight the possibility for an embodiment to be implemented in a distributed/modular fashion.

In an embodiment, a method is provided for the fast generation of a JPEG image thumbnail from the full-size JPEG image without producing visible quality deterioration.

In an embodiment, image-transition time on the screen of consumer electronics devices equipped with limited processing resources is reduced.

An embodiment reduces the image size to a target size by operating directly in the spatial frequency domain, during a decompression stage, by first bringing image size as close as possible to the target size; size refinement, to substantially perfectly match target size, is then performed by spatial subsampling and/or over-sampling. In comparison with conventional methods, a decompression stage takes much less time than full decompression since it operates only on certain frequencies, and at the same time reduces the original image size. Moreover, spatial resizing, when needed, processes a small amount of data.

In an embodiment, the image rendering time on a display device is reduced and made constant and independent of decoding time, by caching thumbnail data in a system memory (or in a user mass storage device, if the memory space available is insufficient, as may be the case in embedded systems). In an embodiment, this limitation is overcome by writing data (e.g., into user mass-storage) without changing its file system data structures. In comparison with conventional methods, writing thumbnail data without altering file system data structures preserves file system integrity threatened by asynchronous user storage media removal.

The arrangement herein provides high performance and is well suited for use in embedded systems and applications where image thumbnails are generated more often required than full images while computational resources are limited. Mobile and fixed consumer electronic devices (such as PDA, mobile phones, digital photo frames, multi-function printers) are exemplary of possible fields of use of this disclosure.

BRIEF DESCRIPTION OF THE DRAWINGS

One or more embodiments will now be described, by way of example only, with reference to the enclosed figures of drawing, wherein:

FIG. 1 is an embodiment of DCT coefficient selection in an embodiment;

FIG. 2 is an embodiment of a Thumbnails Cache Table (TCT); and

DETAILED DESCRIPTION

Figure 3:
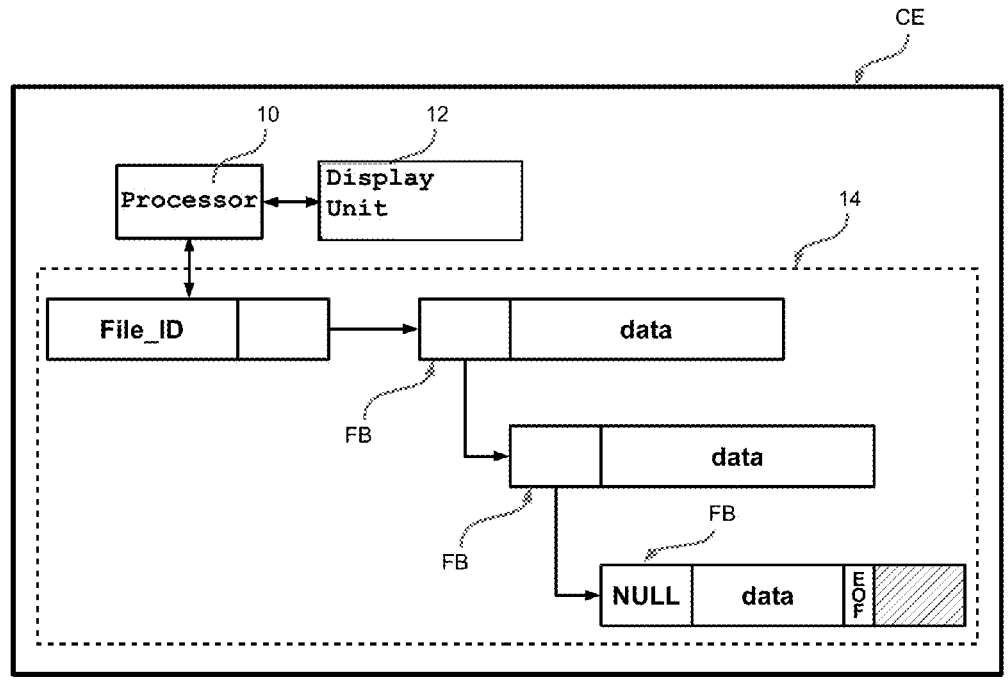
FIGS. 3 and 4 are block diagrams of embodiments of thumbnail caching arrangements.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not limit the scope or meaning of the embodiments.

An embodiment "mixes" image resizing methods operating in the spatial frequency domain (e.g., based on discrete trigonometric transforms) with image resizing methods operating in the image pixel domain.

Assuming that I is the original size image, its thumbnail T can be represented by the following geometrical transformation $$T = G(\text{zoom}, I)$$

where zoom is the computed ratio (smaller than unity) between thumbnail size and image size.

Since T (thumbnail) and I (image) may have different aspect ratios (i.e., the width-to-height ratio), and avoiding geometrical distortion may be advantageous, the parameter zoom is computed as:

$$\min\{(\text{thumbnail\_width}/\text{image\_width}), (\text{thumbnail\_height}/\text{image\_height})\}$$

where min { } denotes the minimum of the two thumbnail-to-image width and height ratios.

In an embodiment, spatial frequency domain resizing is exploited to quickly move towards the target size and subsequently matching it by re-sampling the IDCT output.

Thus a zoom factor factorization is required, so that:

$$\text{zoom} = z_1 \cdot z_2$$

where $z_1$ is the zoom factor used in the spatial frequency domain resizing stage, and $z_2$ is the zoom factor used in the spatial (i.e., pixel) domain.

In addressing the issue of zoom factorization, it may be worth mentioning that spatial frequency zoom-out involves "power of two" factors i.e., $2^k$, so that valid values for $z_1$ are, e.g., in the set $z_1 = \{1/8, 1/4, 1/2, 1\}$.

Zooming out by values in $z_1$ corresponds to considering the lower frequency portions of the image during the IDCT decoding step.

In particular, in the case of $z_1 = \{1/8, 1/4, 1/2, 1\}$ $1 \times 1$, $2 \times 2$, $4 \times 4$ and $8 \times 8$ (full) sub-blocks of DCT coefficients are taken into account, respectively. FIG. 1 shows IDCT filtering according to the corresponding DCT-coefficients-assembling technique.

In this case, zoom factorization is performed by selecting a value for $z_1$ out of the set $\{1/8, 1/4, 1/2, 1\}$.

In the embodiment to which FIG. 1 refers, this selection is based on the following rule:

$$z_1 = 1/k \text{ if } (1/2k) < \text{zoom} \leq (1/k) \, k = 1, 2, 4$$

$$z_1 = 1/8 \text{ if zoom} \leq (1/8)$$

This rule leads to a $z_2$ zoom factor (calculated as $z_2 = \text{zoom}/z_1$) which is smaller than or equal to one. This means that, when not already achieved (as is more often the case) via the $z_1$ zoom factor only, target size matching is achieved via further zoom-out via the $z_2$ zoom factor. In that case, the result of zoom-out via the $z_1$ zoom factor will in most instances be at least marginally "larger" than the target thumbnail size, so that further zoom-out via the $z_2$ zoom factor will be applied to achieve the desired matching to the target size.

It will be appreciated that a rule for selecting the $z_1$ zoom factor may be applied leading to a $z_2$ zoom factor which is larger than or equal to one. In that case, the result of zoom-out via the $z_1$ zoom factor will in most instances be at least marginally "smaller" than the target thumbnail size, so that further zoom-in via the $z_2$ zoom factor will be applied to achieve the desired matching to the target size.

For instance, in order to take further advantage of spatial frequency down-sampling, the $z_1$ function considered in the foregoing may be re-arranged as follows:

$$z_1 = 1/k \text{ if } (1/2qk) < \text{zoom} \leq (1/qk) \, k = 1, 2, 4$$

$$z_1 = 1/8 \text{ if zoom} \leq (1/q8)$$

where the parameter q can vary between $\{0.5, 1\}$ and has the effect to expand and move the $z_1$ function in a geometric fashion.

In other words, under a specified threshold, the original image is zoomed out more than necessary. When this occurs, the $z_2$ zoom factor (again calculated as $z_2 = \text{zoom}/z_1$) becomes larger than one, and a zoom-in processing is performed in order to achieve the desired target size.

The parameter q affects the trade-off between image degradation and time performance of the whole method.

Values for q close to 0.5 lead to time performance improvements (i.e., thumbnail generation is quicker), but introduce more image degradation in comparison with direct zooming, in that the image is first scaled down and then scaled up (other than in the case where zoom<1/8).

Conversely, values for q close to 1 typically do not introduce further image degradation, as in most cases, the image is only scaled down, but a less satisfactory time performance may ensue.

Figure 4:
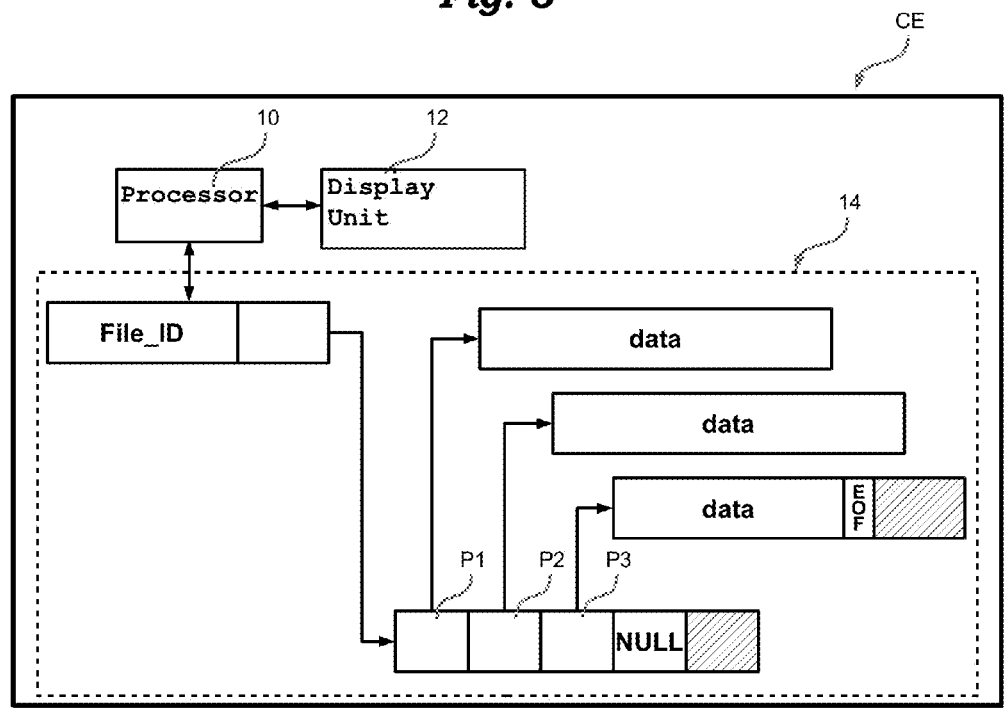

In both FIGS. 3 and 4, reference 10 denotes a processor module including zooming processor features for JPEG thumbnail generation as described in the foregoing. In an embodiment, such a processor is a conventional zooming processor including processing resources adapted to perform thumbnail generation according to the conventional methods discussed in the introductory portion of this disclosure.

In the embodiments considered, the processor 10 is included in a consumer electronics device CE (e.g., any of the consumer electronics devices discussed in the introductory portion of this description). The processor 10 is configured for interacting with a display unit 12 and a memory 14 for storing (caching) thumbnail data related to thumbnails to be displayed in the unit 12.

The processor 10 is programmed (in a manner known per se) to implement the zoom=$z_1 \cdot z_2$ processing discussed in the foregoing. Such zoom=$z_1 \cdot z_2$ processing entails advantages in terms of quality v. processing time/resources discussed previously.

Especially in low-capacity embedded systems, instantaneously refreshing images on an associated display device may be a critical factor. For that reason, once a first thumbnail has been generated, the processor 10 may generate (i.e., calculate) thumbnails in advance for display as soon as required: e.g., while a current picture is being displayed, "next" thumbnail data is generated in the background and cached into a system memory, ready to be displayed on demand.

As already indicated, certain embedded systems may not have sufficient memory resources to perform conventional thumbnail caching, while writing files into the file system of the storage device may result in corruption of the file system if the media is removed.

An embodiment considered herein is file system safe, in that it caches thumbnails into free blocks of the file system, without identifying them as allocated space. In this way, file-system data structures are never modified, so that integrity is always guaranteed. This can be successfully accomplished if no writing access chooses one of these occupied (by a thumbnail) blocks on the storage device in the meantime. For instance, this condition may be achieved when multitasking is not implemented.

In order to exemplify such an approach, one may think of generic file system metadata as a bitmap used to track allocated blocks. After volume creation, the bitmap will indicate that most blocks are free, typically having all bits clear. As the file system is used in write mode, the bitmap is updated to indicate used storage blocks. In order to find free space for thumbnails caching, the method is made file system aware (i.e., the bitmap is checked so that thumbnails are written to unoccupied blocks), so that user data corruption is avoided.

For instance, a fixed number of image thumbnails may be cached. Images to be cached are chosen in an application-specific manner. For instance, in the case of an application supporting image browsing in n-up mode, it could be useful to have 3n thumbnails cached for the current, previous, and next page. Conversely, if an application supports only a slide-show mode, then the very next photo is cached.

Once available free blocks have been found, a Thumbnail Cache Table (TCT) is allocated into the main memory. That table will be filled in and updated each time a new thumbnail is generated as shown in FIG. 2. There, the File_ID field represents a unique image file identifier (e.g., path/filename) and the First Block Address field represents a pointer to a first block of image thumbnail data.

FIGS. 3 and 4 are exemplary of two approaches for storing thumbnails in the memory 14.

In FIG. 3, each thumbnail is stored as a linked list of storage blocks (designated "data").

The first bytes FB of each block are used as a pointer to the next one. The rest of the block is for data ended by EOF within the last block. The list is terminated with a special marker that is not a valid block number File_ID (FB=NULL for the last block in the list).

In FIG. 4, a tree-like arrangement is used where a first ("root") block is used to store a sequence of pointers P1, P2, P3 to blocks of data.

If the first block is not enough to store all the block pointers, its last address is used to point to a second block of block pointers, and so on.

The sequence of pointers is ended with a special marker NULL that is not a valid block number. Again, the data is terminated with a special marker EOF.

The number of thumbnails that can be cached (and hence the number of entries in the thumbnail cache table) may be obtained as a parameter designated cached_thumbs by means of the following formula:

$$\min\{(\text{free\_disk\_space}/\text{thumbnail\_size}),$$

$$(\text{free\_RAM\_space}/\text{TCT\_record\_size}), \text{JPEG\_files}\}$$

where min { } again denotes the minimum operator and where:
free_disk_space is the available space within user mass storage; this may be calculated, e.g., by parsing the file system metadata;
thumbnail_size is derived from the display resolution and its color depth; this size takes into account also the block-pointers overhead (i.e., the amount of memory occupied by the pointers FB or P1, . . . , Pn);
free_RAM_space represents the amount of free main memory that can be dedicated to the allocation of Thumbnails Cache Table;
TCT_record_size is the dimension of a single TCT entry; and
JPEG_files is simply the number of pictures on the user mass storage.

The number of cached_thumbs calculated as above can be possibly scaled down by other factors. For instance, the cache could be oversized if the processor has limited computation resources compared to application requirements, in which case the processor may be unable to fill the whole cache.

Without prejudice to the underlying principles of the disclosure, the details and the embodiments may vary, even appreciably, with respect to what has been described by way of example only, without departing from the spirit and scope of the disclosure.

Naturally, in order to satisfy local and specific requirements, a person skilled in the art may apply to the embodiments described above many modifications and alterations. Particularly, although one or more embodiments have been described with a certain degree of particularity, it should be understood that various omissions, substitutions, and changes in the form and details as well as other embodiments are possible. Moreover, it is expressly intended that specific elements and/or method steps described in connection with any disclosed embodiment may be incorporated in any other embodiment as a general matter of design choice.

What is claimed is:

1. A method of generating a thumbnail, the method comprising:
   identifying a thumbnail having a given size from an image for which a spatial frequency domain representation is available;
   reducing the size of said image by zooming;
   wherein said zooming comprises a spatial frequency domain zooming on the image to generate the thumbnail having an initial size and an image pixel domain zooming to fit said thumbnail to the given size.

2. The method of claim 1, wherein said image pixel domain zooming follows said spatial frequency domain zooming.

3. The method of claim 2, wherein said spatial frequency domain zooming comprises spatial frequency subsampling in the transform domain during image decoding, whereby said image pixel domain zooming is performed on the image resulting from said decoding.

4. The method of claim 1, wherein said image pixel domain zooming includes zooming in to enlarge the result of said spatial frequency domain zooming.

5. The method of claim 1, wherein said pixel domain zooming includes zooming out to reduce the result of said spatial frequency domain zooming.

6. The method of claim 1, wherein said spatial frequency domain zooming comprises zooming out said image by a power of two factor.

7. The method of claim 1, including caching a plurality of said thumbnails in a file system as free blocks in said file system, whereby file system data structures are left unchanged.

8. The method of claim 1, including caching a plurality of said thumbnails as a linked list of storage blocks.

9. The method of claim 8, wherein said linked list of storage blocks includes at least one block including a pointer to a next block in said linked list.

10. The method of claim 1, including caching a plurality of said thumbnails in a tree-like arrangement.

11. The method of claim 10, wherein said tree-like arrangement includes at least one block storing a sequence of pointers to other blocks in said tree-like arrangement.

12. A method of generating a thumbnail, the method comprising:
identifying a thumbnail having a given size from an image for which a spatial frequency domain representation is available;
reducing the size of said image by zooming;
wherein said zooming comprises a spatial frequency domain zooming on the image to generate the thumbnail having an initial size and an image pixel domain zooming to fit said thumbnail to the given size;
wherein said spatial frequency domain zooming comprises applying a zooming factor z1 wherein:
z1 is equal to 1/k if (½qk) is less than a zoom value and if the zoom value is less than or equal to (1/qk) when k is equal to 1, 2, or 4; and
wherein z1 is equal to ⅛ if the zoom value is less than or equal to (1/q8);
where:
the zoom value comprises an overall zooming factor resulting from both said spatial frequency domain zooming and said pixel domain zooming, and
q comprises a parameter selected in the interval {0.5, 1}.

13. A method of generating and storing thumbnails having a given size, the method comprising:
reducing the size of images by zooming, wherein said zooming comprises a spatial frequency domain zooming on the image to generate the thumbnail having an initial size and an image pixel domain zooming to fit said thumbnail to the given size; and
caching a plurality of said thumbnails in a file system as free blocks in said file system.

14. The method of claim 13, including caching a plurality of said thumbnails as a linked list of storage blocks.

15. The method of claim 14, wherein said linked list of storage blocks includes at least one block including a pointer to a next block in said linked list.

16. The method of claim 13, including caching a plurality of said thumbnails in a tree-like arrangement.

17. The method of claim 16, wherein said tree-like arrangement includes at least one block storing a sequence of pointers to other blocks in said tree-like arrangement.

18. A system for generating thumbnails, the system comprising;
a zooming processor configured to perform a spatial frequency domain zooming on an image to generate a thumbnail having a first size and configured to perform an image pixel domain zooming to fit said thumbnail to a second size; and
wherein said zooming processor is configured to perform said image pixel domain zooming following said spatial frequency domain zooming.

19. The system of claim 18, wherein said zooming processor is configured to perform said spatial frequency domain zooming as spatial frequency subsampling in the transform domain during image decoding, whereby said zooming processor is configured to perform said image pixel domain zooming on images resulting from said decoding.

20. The system of claim 18, wherein said zooming processor is configured to perform said image pixel domain zooming by zooming in to enlarge the result of said spatial frequency domain zooming.

21. The system of claim 18, wherein said zooming processor is configured to perform said pixel domain zooming by zooming out to reduce the result of said spatial frequency domain zooming.

22. The system of claim 18, wherein said zooming processor is configured to perform said spatial frequency domain zooming by zooming out said images by a power of two factor.

23. A system for generating thumbnails, the system comprising:
a zooming processor configured to perform both a spatial frequency domain zooming on an image to generate a thumbnail having a first size and configured to perform an image pixel domain zooming to fit said thumbnail to a second size;
wherein said zooming processor is configured to perform said spatial frequency domain zooming by applying a zooming factor z1 wherein:
z1 is equal to 1/k if (½qk) is less than a zoom value and if the zoom value is less than or equal to (1/qk) when k is equal to 1, 2, or 4; and
wherein z1 is equal to ⅛ if the zoom value is less than or equal to (1/q8);
where:
the zoom value comprises an overall zooming factor resulting from both said spatial frequency domain zooming and said pixel domain zooming, and
q comprises a parameter selected in the interval {0.5, 1}.

24. The system of claim 23, including cache storage configured to store the thumbnail as a linked list of storage blocks.

25. The system of claim 24, wherein said linked list of storage blocks in said cache storage includes at least one block including a pointer to a next block in said linked list.

26. A system for generating and storing thumbnails having a given size from images, the system comprising:
a zooming processor configured to perform a spatial frequency domain zooming on an image to generate a thumbnail having a first size and configured to perform an image pixel domain zooming to fit said thumbnail to a second size, the system including cache storage configured to store a plurality of said thumbnails in a file system as free blocks in said file system.

27. The system of claim 26, including cache storage configured to store the thumbnail in a file system as free blocks in said file system, whereby file system data structures are left unchanged.

28. A device, comprising: a system for generating thumbnails having a given size from images for which a spatial frequency domain representation is available, the system including a zooming processor configured to perform a spatial frequency domain zooming on an image to generate a thumbnail having a first size and configured to perform an image pixel domain zooming to fit said thumbnail to a second size.

29. The system of claim 28, including cache storage configured to store the thumbnail in a tree-like arrangement.

30. The system of claim 29, wherein said tree-like arrangement in said cache storage includes at least one block storing a sequence of pointers to other blocks in said tree-like arrangement.

31. A device, comprising:
a system for generating and storing thumbnails having a given size, said thumbnails generated from images for which a spatial frequency domain representation is available, the system including a zooming processor configured to perform a spatial frequency domain zooming on an image to generate a thumbnail having a first size and configured to perform an image pixel domain zooming to fit said thumbnail to a second size, the system including cache storage configured to store a plurality of said thumbnails in a file system as free blocks in said file system.

32. The system of claim 31, including cache storage configured to store the plurality of said thumbnails as a linked list of storage blocks.

33. The system of claim 32, wherein said linked list of storage blocks in said cache storage includes at least one block including a pointer to a next block in said linked list.

34. A non-transitory computer-readable medium loadable in the memory of at least one computer and including software code portions configured to be run on a computer in order to generate a thumbnail having a given size from an image, said generating including reducing the size of said image by zooming, wherein said zooming comprises a spatial frequency domain zooming on an image to generate the thumbnail having an initial size and an image pixel domain zooming to fit said thumbnail to the given size.

35. The non-transitory computer-readable medium of claim 34, wherein the software code portions include cache storage configured to store the plurality of said thumbnails in a tree-like arrangement.

36. The non-transitory computer-readable medium of claim 35, wherein said tree-like arrangement in said cache storage includes at least one block storing a sequence of pointers to other blocks in said tree-like arrangement.

37. A non-transitory computer-readable medium loadable in the memory of at least one computer and including software code portions configured to be run on a computer for:
reducing the size of said image by zooming, wherein said zooming comprises a spatial frequency domain zooming on an image to generate the thumbnail having an initial size and an image pixel domain zooming to fit said thumbnail to the given size; and
storing the image including caching the thumbnail in a file system as a free block in said file system.

38. The non-transitory computer-readable medium of claim 37, wherein the software code portions include cache storage configured to store the plurality of said thumbnails in a tree-like arrangement.

39. The non-transitory computer-readable medium of claim 38, wherein said tree-like arrangement in said cache storage includes at least one block storing a sequence of pointers to other blocks in said tree-like arrangement.

* * * * *